United States Patent
Liu

(10) Patent No.: US 8,455,126 B2
(45) Date of Patent: Jun. 4, 2013

(54) BATTERY POSITIONING DEVICE

(75) Inventor: Zhi-Hua Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 653 days.

(21) Appl. No.: 12/644,351

(22) Filed: Dec. 22, 2009

(65) Prior Publication Data

US 2011/0097616 A1    Apr. 28, 2011

(30) Foreign Application Priority Data

Oct. 28, 2009   (CN) .......................... 2009 1 0308974

(51) Int. Cl.
*H01M 2/10*   (2006.01)

(52) U.S. Cl.
USPC ................. 429/97; 429/96; 429/100

(58) Field of Classification Search
USPC ............................. 429/96–98, 100
See application file for complete search history.

(56) References Cited

U.S. PATENT DOCUMENTS 4,371,594 A * 2/1983 Ohara et al. .................... 429/97
4,690,878 A * 9/1987 Nakamura ........................ 429/1

* cited by examiner

*Primary Examiner* — Basia Ridley
*Assistant Examiner* — Jonathan G Leong
(74) *Attorney, Agent, or Firm* — Altis Law Group, Inc.

(57) ABSTRACT

A battery positioning device for fixing a battery includes a base defining a receiving groove to receive the battery, a first elastic member fixed in the receiving groove to resist a positive electrode of the battery. The first elastic member includes a main body, a fixing portion fixed to the base, and an operating portion. The main body includes a hook thereon. The hook includes a resisting portion to resist the positive electrode of the battery and a hooking portion hooking the positive electrode. The fixing portion and the operating portion extend from opposite ends of the main body, respectively. The operating portion is capable of moving away from the battery, thus deforming the first elastic member to elevate the battery by the hooking portion.

8 Claims, 4 Drawing Sheets

BATTERY POSITIONING DEVICE

BACKGROUND

1. Technical Field

The present disclosure generally relates to battery positioning devices, and particularly, to a battery positioning device used to hold a dry battery.

2. Description of Related Art

Dry batteries are used in many portable electronic devices to supply electric power. The portable electronic device usually includes a battery positioning device to retain the batteries within the electronic device.

A typical battery positioning device has a base which defines a receiving groove, and two elastic members fixed in the receiving groove to contact two electrodes of the battery. During installation, the battery is received in the receiving groove, and the two electrodes of the battery are firmly resisted by the two elastic members.

However, due to the narrowness of the receiving groove and relative pressure provided by the two elastic members to the two electrodes, a small tool or other aid is required to withdraw the battery from the battery positioning device. Therefore, it is very inconvenient to remove and replace the battery.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
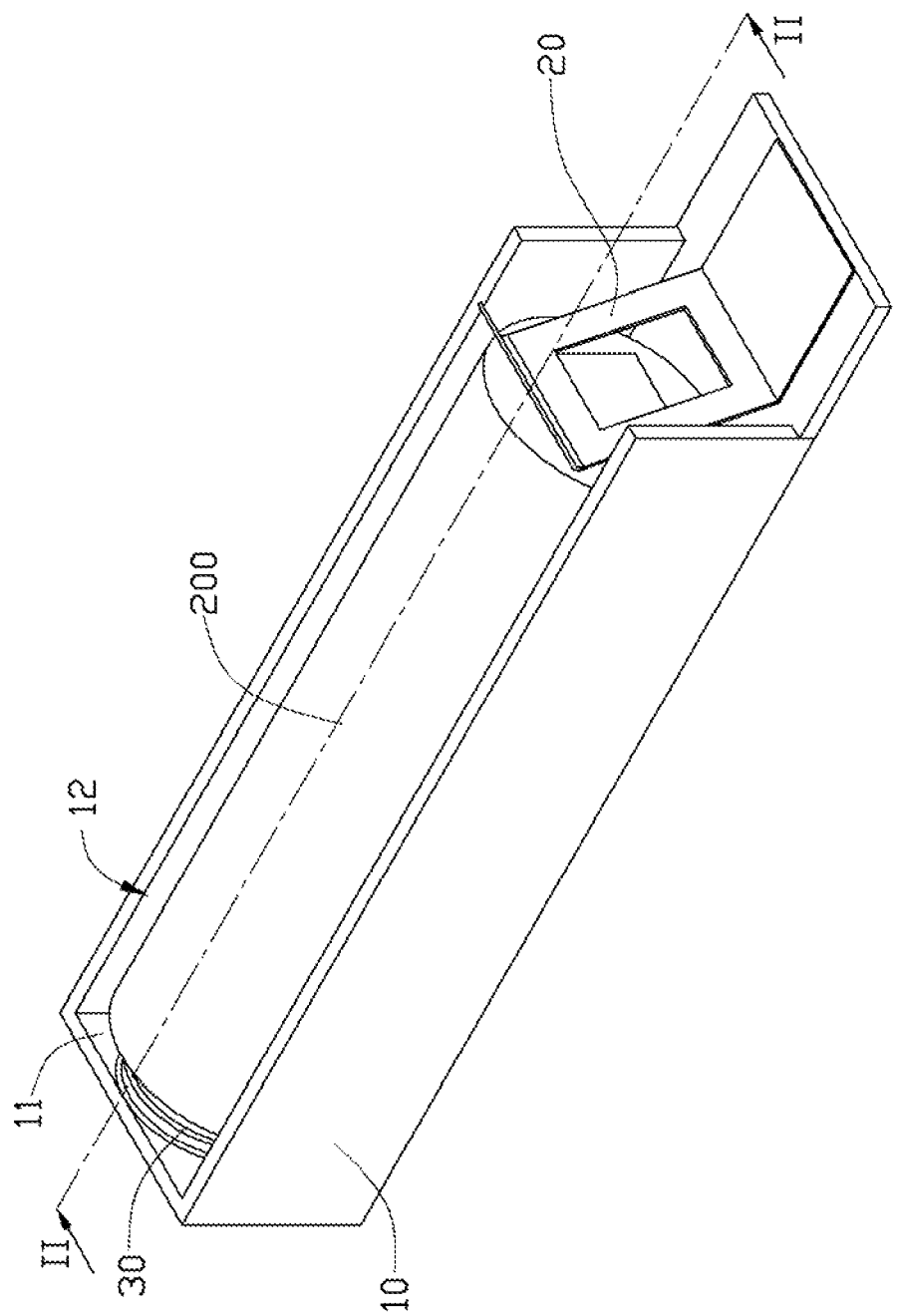
FIG. 1 is an assembled, isometric view of an embodiment of a battery positioning device receiving a dry battery, the battery positioning device including a first elastic member.
Figure 2:
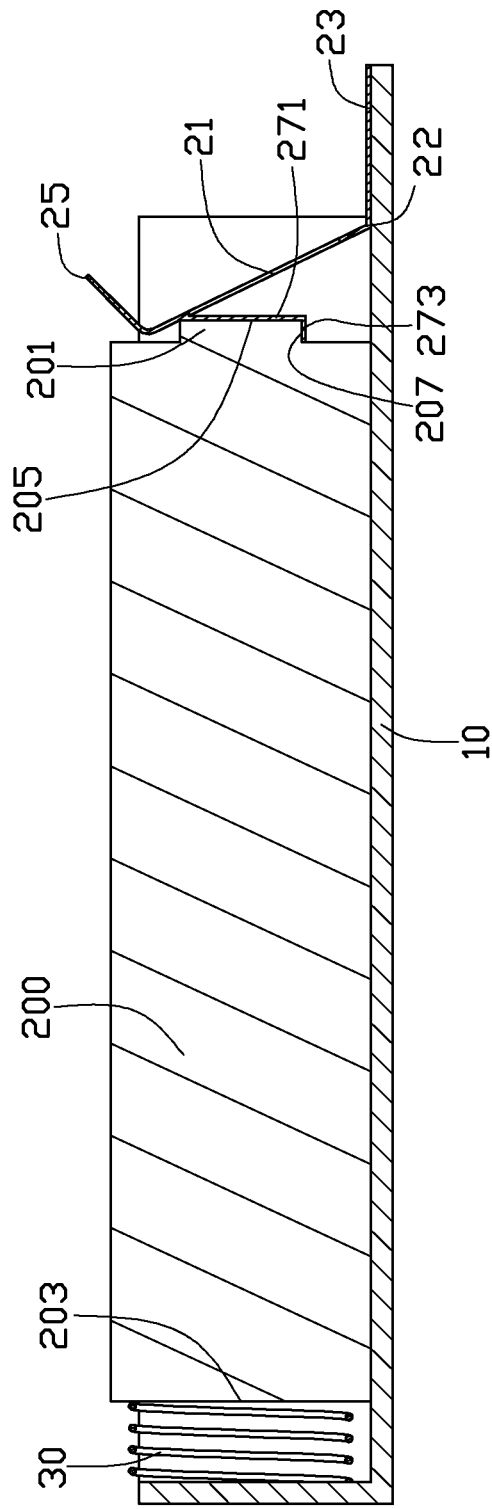
FIG. 2 is a sectional view of the of the battery positioning device of FIG. 1 taken along line II-II.

A battery positioning device 100 may be used in portable electronic devices, such as music players, cameras, and digital video players. Referring to FIGS. 1 and 2, an embodiment of the battery positioning device 100 is disclosed.

The battery positioning device 100 holds a battery 200. The battery 200 includes a positive electrode 201 protruding from an end of the battery 200 and a negative electrode 203 formed on the other end of the battery 200. The positive electrode 201 includes a top surface 205 and a side surface 207 connected to the top surface 205.

The battery positioning device 100 includes a substantially rectangular base 10. The base 10 defines a receiving groove 11 with an opening 12 from where the battery can be taken out so as to separate the battery 200 from the receiving groove 11. The side surface 207 faces away from the opening 12. The receiving groove 11 has a substantially similar shape as the battery 200. The battery positioning device 100 further includes a first elastic member 20 and a second elastic member 30 fixed in the receiving groove 11. The first elastic member 20 is configured to resist the positive electrode 201 and the second elastic member 30 is configured to resist the negative electrode 203.

Figure 3:
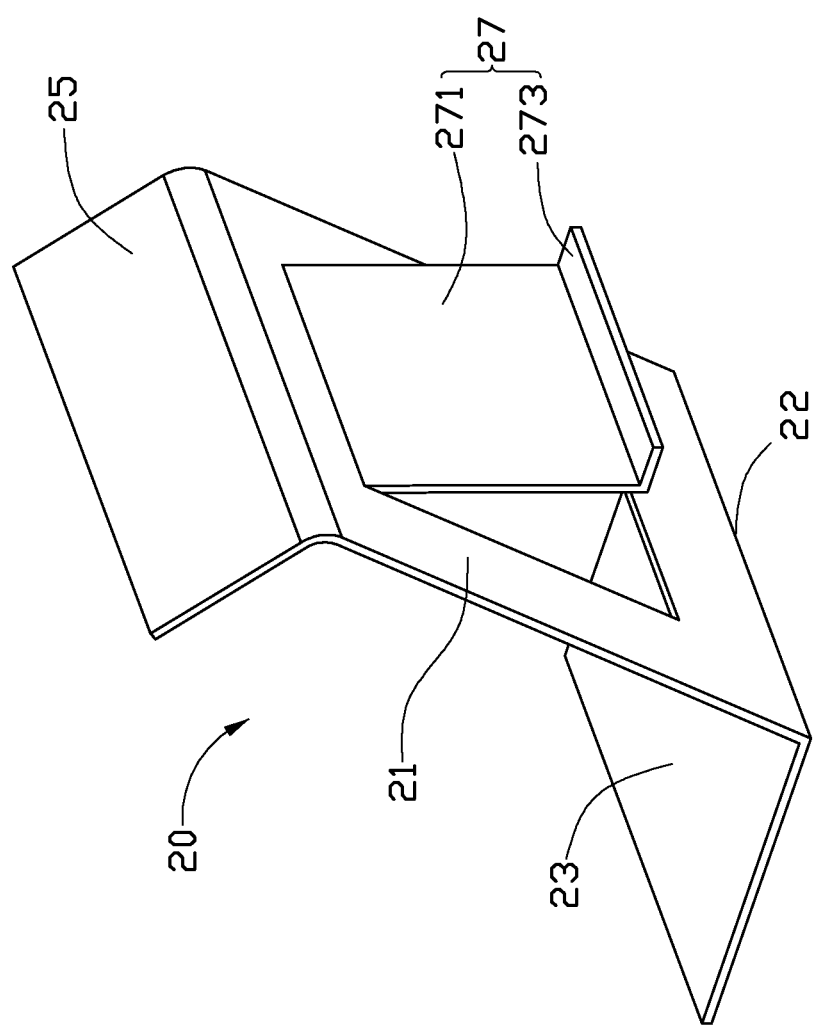
FIG. 3 is an enlarged, isometric view of the first elastic member of the battery positioning device of FIG. 1.

Referring to FIG. 3, the first elastic member 20 can be a metal sheet processed by mechanical bending. The first elastic member 20 includes a main body 21, a fixing portion 23 extending from one end of the main body 21, and an operating portion 25 extending from another end of the main body 21 opposite to the fixing portion 23. The fixing portion 23 and the operating portion 25 bend toward one side of the main body 21. The main body 21 and the fixing portion 23 are connected by a connecting portion 22. The fixing portion 23 is substantially rectangular, and can be fixed to the base 10 by, for example, welding or gluing. The main body 21 angles toward the second elastic member 30 and meets the fixing portion 23 at an obtuse angle. The main body 21 forms a hook 27 thereon. The hook 27 includes a resisting portion 271 and a hooking portion 273 extending substantially perpendicular to an end of the resisting portion 271. The resisting portion 271 defines a plane substantially perpendicular to another plane defined by the fixing portion 23. The resisting portion 271 is able to resist the top surface 205 of the battery 200. The hooking portion 273 is able to resist the side surface 207 of the battery 200. In the illustrated embodiment, the hook 27 is fabricated by stamping and bending a middle portion of the main body 21, because the hook 27 and the main body 21 are integrally formed. The operating portion 25 is substantially rectangular for easy handling.

In the illustrated embodiment, the second elastic member 30 is a spring fixed in the receiving groove 11 resisting the negative electrode 203.

Figure 4:
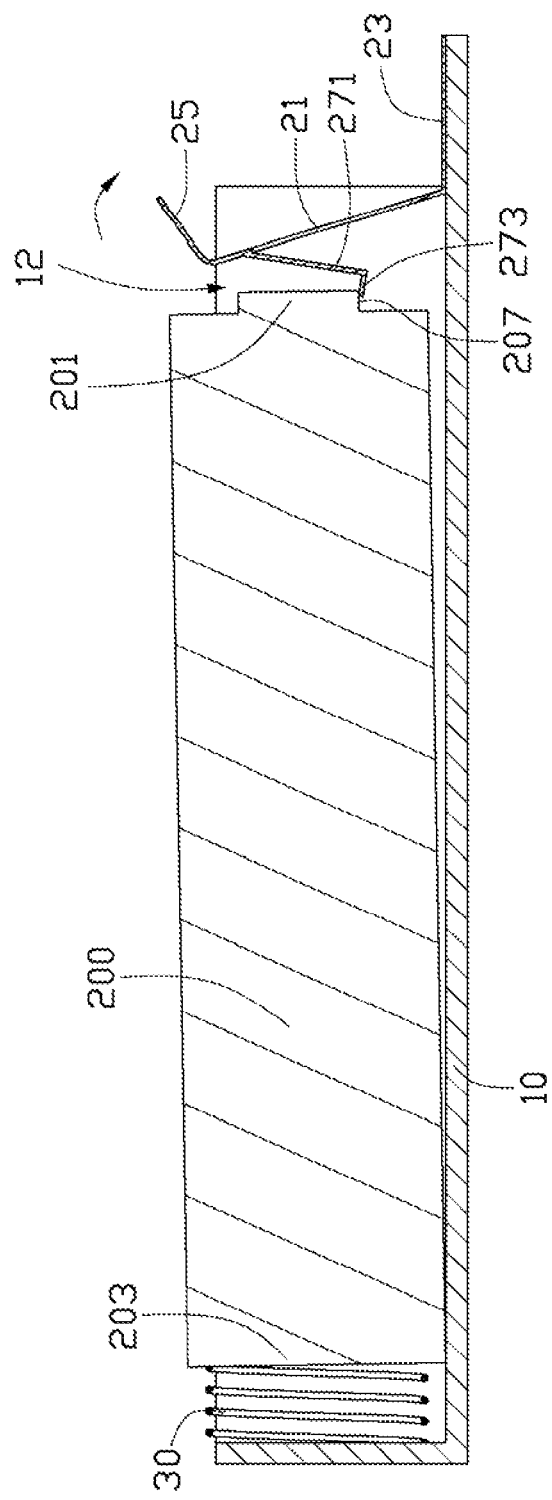
FIG. 4 is similar to FIG. 2, but shows a different working state of the battery positioning device.

Referring to FIGS. 2 and 4, during installation, the battery 200 is received in the receiving groove 11, the positive electrode 201 of the battery 200 is resisted by the resisting portion 271 of the first elastic member 20, and the negative electrode 203 is resisted by the second elastic member 30. During removal of the batter 200, impelling the operating portion 25 away from the battery 200 deforms the first elastic member 20. The main body 21 rotates around the connecting portion 22 close to the fixing portion 23, and the hooking portion 273 of the hook 27 pushes the positive electrode 201 on the side surface 207 and makes the battery 200 move towards the opening 12, such that the battery 200 is withdrawn a short distance out of the receiving groove 11. The battery 200 is then easily removed from the portable electronic device. After removal, the first elastic member 20 is restored to its original condition by a resilient force.

It is to be understood that the fixing portion 23 and the operating portion 25 may be on the two sides of the main body 21, such that the main body 21 rotates around the connecting portion 22 away from the fixing portion 23 when the operating portion 25 receives pressure.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A battery positioning device for fixing a battery having a positive electrode and a negative electrode, comprising:
   a base defining a receiving groove configured to receive the battery;
   a first elastic member fixed in the receiving groove and configured to resist the positive electrode of the battery, comprising:

a main body comprising a first end and a second end that is opposite to the first end;

a hook disposed on one side of the main body, comprising:
a resisting portion connecting to the main body and configured to resist the positive electrode of the battery; and
a hooking portion connected to a free end of the resisting portion separate from the main body and configured to hook the positive electrode a fixing portion connecting to the first end of the main body and fixed to the base; and an operating portion connecting to the second end of the main body; wherein the resisting portion of the hook resists a top surface of the positive electrode and the hooking portion resists a side surface of the positive electrode connected to the top surface;

wherein the operating portion is configured to move away from the battery, thus deforming the first elastic member to elevate the battery by the hooking portion; and wherein the base comprises an opening from where the battery is taken out, the hooking portion of the hook is configured to push the positive electrode on the side surface and towards the opening, when the operating portion moves away from the battery and the first elastic member is deformed.

2. The battery positioning device of claim 1, wherein the fixing portion and the operating portion bend toward one side of the main body; when the operating portion moves away from the battery, the main body rotates close to the fixing portion, thus deforming the first elastic member.

3. The battery positioning device of claim 1, further comprising a second elastic member positioned in the receiving groove and configured to resist the negative electrode of the battery.

4. A battery positioning device for fixing a battery having a positive electrode and a negative electrode, comprising:

a base defining a receiving groove configured to receive the battery, wherein an opening is defined on the base, the opening allowing separation of the battery from the receiving groove;

a first elastic member fixed in the receiving groove and configured to resist the positive electrode of the battery, comprising:

a main body having, a hook disposed on one side of the main body, the hook comprising a resisting portion configured to resist a top surface of the positive electrode and a hooking portion configured to hook a side surface of the positive electrode facing away from the opening;

a fixing portion fixed to the base and connected to the main body; and an operating portion connected to the main body;

wherein the hooking portion of the hook is configured to push the positive electrode on the side surface and make the battery move towards the opening so as to elevate the battery when the operating portion moves away from the battery and the first elastic member is deformed.

5. The battery positioning device of claim 4, wherein the main body comprises a first end and a second end that is opposite to the first end, the fixing portion is connected to the first end of the main body and the operating portion is connected to the second end of the main body.

6. The battery positioning device of claim 4, wherein the resisting portion extends from the main body and the hooking portion extends from an end of the resisting portion that is separate from the main body.

7. The battery positioning device of claim 6, wherein the fixing portion and the operating portion bend towards one side of the main body; when the operating portion moves away from the battery, the main body rotates close to the fixing portion, thus deforming the first elastic member.

8. The battery positioning device of claim 4, further comprising a second elastic member positioned in the receiving groove and configured to resist the negative electrode of the battery.

* * * * *